United States Patent [19]

Auffret et al.

[11] Patent Number: 5,434,692
[45] Date of Patent: Jul. 18, 1995

[54] OPTICAL DEVICE FOR THE RECOVERY OF THE TIMING OF A CODED SIGNAL

[75] Inventors: René Auffret, Perros Guirec; Patrice Pottier, Bais; Georges Claveau, Camlez, all of France

[73] Assignee: France Telecom, France

[21] Appl. No.: 215,189

[22] Filed: Mar. 21, 1994

[30] Foreign Application Priority Data

Mar. 29, 1993 [FR] France ............... 93 03592

[51] Int. Cl.⁶ ............................ H04B 10/00
[52] U.S. Cl. ................. 359/158; 359/140; 359/181
[58] Field of Search ........ 359/158, 140, 173, 181–183, 359/187, 194, 135

[56] References Cited

U.S. PATENT DOCUMENTS 5,339,185  8/1994  Kaede ................. 359/158

FOREIGN PATENT DOCUMENTS

| 2681747 | 3/1993 | France | H04L 7/02 |
| 3177626 | 7/1988 | Japan | H04B 9/00 |
| 1150121 | 6/1989 | Japan | G02F 1/35 |
| 3006541 | 3/1991 | Japan | G02F 3/00 |
| 3022855 | 11/1993 | WIPO | 359/135 |

OTHER PUBLICATIONS

"A Dual-Drive Ti:LiNbO3 Mach-Zehnder Modulator Used As An Optoelectric . . . ", IEEE Photonics Tech. Letters, vol. 4., No. 6, Jun. 1992, New York, pp. 592-593, Hansen et al.

"Wavelength Conversion for FM Light . . . ", Electronic Letters, vol. 25, No. 20, Sep. 1989, K. Inoue et al, pp. 1361-1362.

Chahat et al. "Optical Clock Recovery Demonstration Using Periodic Oscillations of a Hybrid Electrooptic Bistable System", IEEE Photonics Technology Letters, vol. 3, No. 1, Jan. 1991, pp. 65-67.

Primary Examiner—David K. Moore
Assistant Examiner—Kinfe-Michael Negash
Attorney, Agent, or Firm—Hayes, Soloway, Hennessey, Grossman & Hage

[57] ABSTRACT

An optical device for recovering the timing of a signal (Si) coded by a digital code, such as the NRZ, CMI, biphase or similar code, is provided. The device has a circuit for shaping and transforming the coded signal into the form of a series of pulses of duration equal to T/2 and occurrence equal to N×T, and a timing recovery circuit for determining the timing signal. The present invention has particular utility in the area of digital transmission by optical fibers, although other utilities are also contemplated.

9 Claims, 3 Drawing Sheets

OPTICAL DEVICE FOR THE RECOVERY OF THE TIMING OF A CODED SIGNAL

BACKGROUND OF THE INVENTION

1. Field of the Invention

The present invention relates to an optical device making it possible to recover the timing (also known as clock) of a signal coded by a digital code. It has numerous applications in the field of data transmission by optical fibres.

2. Brief Description of Related Art

In most digital transmission systems, it is necessary to be able to resynchronize, on reception, the information signal transmitted in digital form in order to read the information contained therein. Numerous electronic devices able to recover the timing of the information signal (i.e. the clock of the coded signal which they receive) are known. However, when the transmission system is of the optical type (transmission by optical fibres), it is often important to ensure the optical continuity in the system. It is then necessary to use an optical timing recovery device.

The document by D. J. AS, R. EGGEMANN et al entitled "Clock recovery based on a new type of self-pulsation in a 1.5 μm two-section InGaAsP-InP DFB laser", published in Electronics Letters, 21.1.1991, vol. 29, No. 2 describes such an optical timing recovery device. This device, which uses feedback laser diodes, suffers from the main disadvantage of only permitting timing recovery on the basis of signals coded by the RZ (return to zero) code for which each information bit (bit in state 1) of the signal has a duration equivalent to a half clock cycle.

SUMMARY OF THE INVENTION

The present invention aims at obviating this disadvantage. To this end, it proposes an optical device for the recovery of the clock or timing of signals coded according to different digital codes such as the NRZ (non-return to zero) code, where each information bit at 1 has a duration of a clock period, the CMI (Code Mark Inversion) code, where the information bits are alternatively coded 01 and 10, the biphase code, etc.

In order to permit the timing recovery of signals codable according to numerous different digital codes, upstream of the timing recovery circuit, the device according to the invention has a circuit for shaping the coded signal received. This shaping circuit transcribes the coded signal into the form of a pulse train in accordance with the following conditions:

the pulses have a duration equal to a half clock cycle (T/2),
the pulses have a variable occurrence equal to N×T, in which N is an integer varying as a function of the digital
code used for the signal.

More specifically, the invention relates to an optical device for recovering the timing of a signal coded by a digital code and transmitted to said device by means of optical fibre links in order to supply a timing signal, said device having a circuit for shaping the coded signal able to transcribe the latter into the form of a pulse train of duration equal to T/2 and occurence equal to N×T, in which T is the cycle of the timing of the coded signal and N is an integer varying as a function of the digital code encoding the signal, said circuit having an input able to receive the coded signal and an output able to supply the pulse train and a timing recovery circuit having first and second inputs and first and second outputs, the first input being connected to the output of the shaping circuit and the first output being connected to the second input to form a feedback loop, said timing recovery circuit also being able to determine, for each cycle of the timing, a fraction of the signal propagating in the feedback loop in order to supply, to the second output, said signal fraction corresponding to the timing signal.

Advantageously, the circuit for shaping the coded signal has an interferometer of delay R=N×T/2 in order to transform Preferably, the two level coded signal into a three-levels amplitude-modulated signal the interferometer is a MACH-ZEHNDER interferometer, produced in optical fibre form.

According to the invention, the circuit for shaping the coded signal incorporates an AM/FM converter associated in series with the interferometer, in order to convert the amplitude-modulated signal into a frequency-modulated signal. Said AM/FM converter is preferably a laser converter.

It is also possible to associate in series an optical filter with the AM/FM converter and can be set to one of the frequencies of the frequency-modulated signal in order to establish a logic function, the choice of the logic function to be established depending on the digital code of the coded signal.

According to a preferred embodiment of the invention, the timing recovery circuit incorporates a two-to-two coupler making it possible to introduce pulses from the coded signal shaping circuit and produce the feedback loop. Preferably, the two-to-two coupler is produced in optical fibre form.

Advantageously, the timing recovery circuit has an amplifier and an optical filter associated in series in the feedback loop.

According to a feature of the invention, the timing recovery device can have an optical equalizer connected to the second output of the recovery circuit.

DETAILED DESCRIPTION OF EMBODIMENTS

Figure 1:
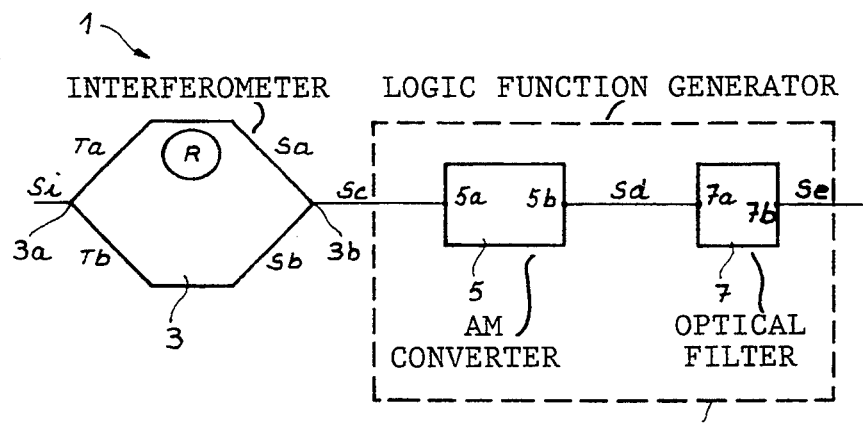
FIG. 1 diagrammatically shows the coded signal shaping circuit.

FIG. 1 diagrammatically shows the circuit for shaping the coded signal received by the device according to the invention. This coded signal shaping circuit is designated 1. Throughout the remainder of the description this will be referred to either as the coded signal shaping circuit or as circuit 1.

This coded signal shaping circuit incorporates an interferometer 3. The signal coded according to any one of the known digital codes (RZ, NRZ, CMI, biphase and similar codes) is introduced into the shaping circuit by the input 3a of the interferometer 3. This signal coded by a digital code and also called the initial signal is given the reference Si. Therefore this signal Si is injected into the interferometer 3, which is preferably a MACH-ZEHNDER interferometer. The advantage of said MACH-ZEHNDER interferometer is that it can be easily produced in optical fibre form. In the preferred embodiment of the invention the interferometer 3 is produced in optical fibre form so as to permit the continuity of the propagation of the signal Si transmitted to the device 1 by optical fibre links.

Figure 3:
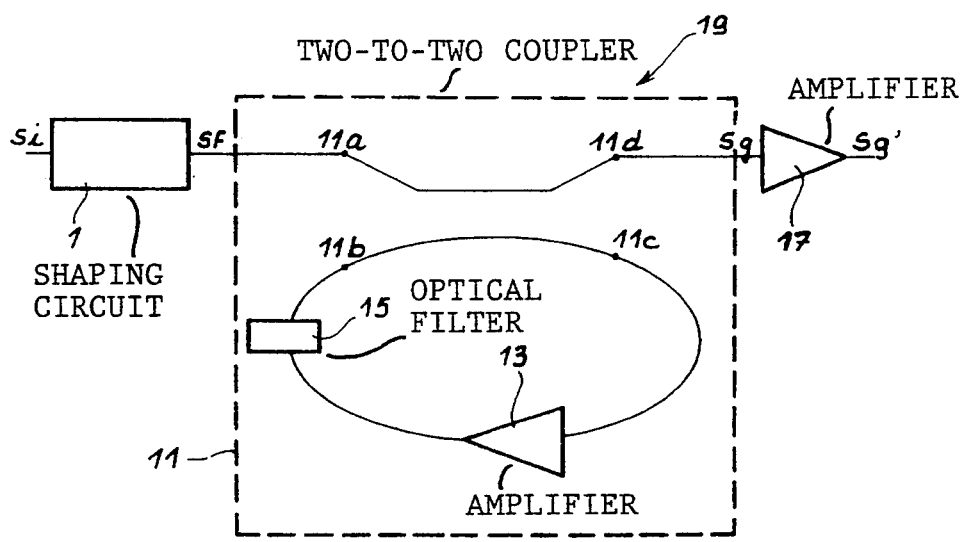
FIG. 3 diagrammatically shows the timing recovery circuit connected to the output of the shaping circuit.

When the signal Si is introduced into the interferometer 3 it is able to follow two paths, namely the path Ta and the path Tb. The delay or lag R between the two paths, i.e. the path difference between Ta and Tb, is substantially equal to T/2. The signals used in the interferometer for the path Ta and for the path Tb are respectively designated Sa and Sb. These signals Sa and Sb are shown in FIG. 3, which will be described in greater detail hereinafter. These signals Sa and Sb are displaced by approximately a half-cycle T/2 by the interferometer. Thus, the signal Sc obtained at the output 3b of the interferometer 3 is the signal resulting from the signals Sa and Sb. This optical signal Sc then has three amplitude levels A1, A2 and A3, as shown in FIG. 3.

However, in order to avoid any interference, i.e. any optical beat of the two signals Sa and Sb at the output, it is preferable to increase the delay R in such a way that:

$$R = N \times T/2 > r \times Lc$$

in which N is an integer, r is the propagation time of the signals in the fibre (substantially 5 ns/m) and Lc is the coherence length of the optical carrier with $$Lc = \frac{\lambda^2}{\delta\lambda} = \frac{c}{\delta\nu \times n}$$

in which $\lambda$ is the wavelength of the optical carrier, $\delta\lambda$ the spectral space requirement, c the speed of light, $\delta\nu$ the frequency space requirement and n the index of the propagation medium.

Figure 2:
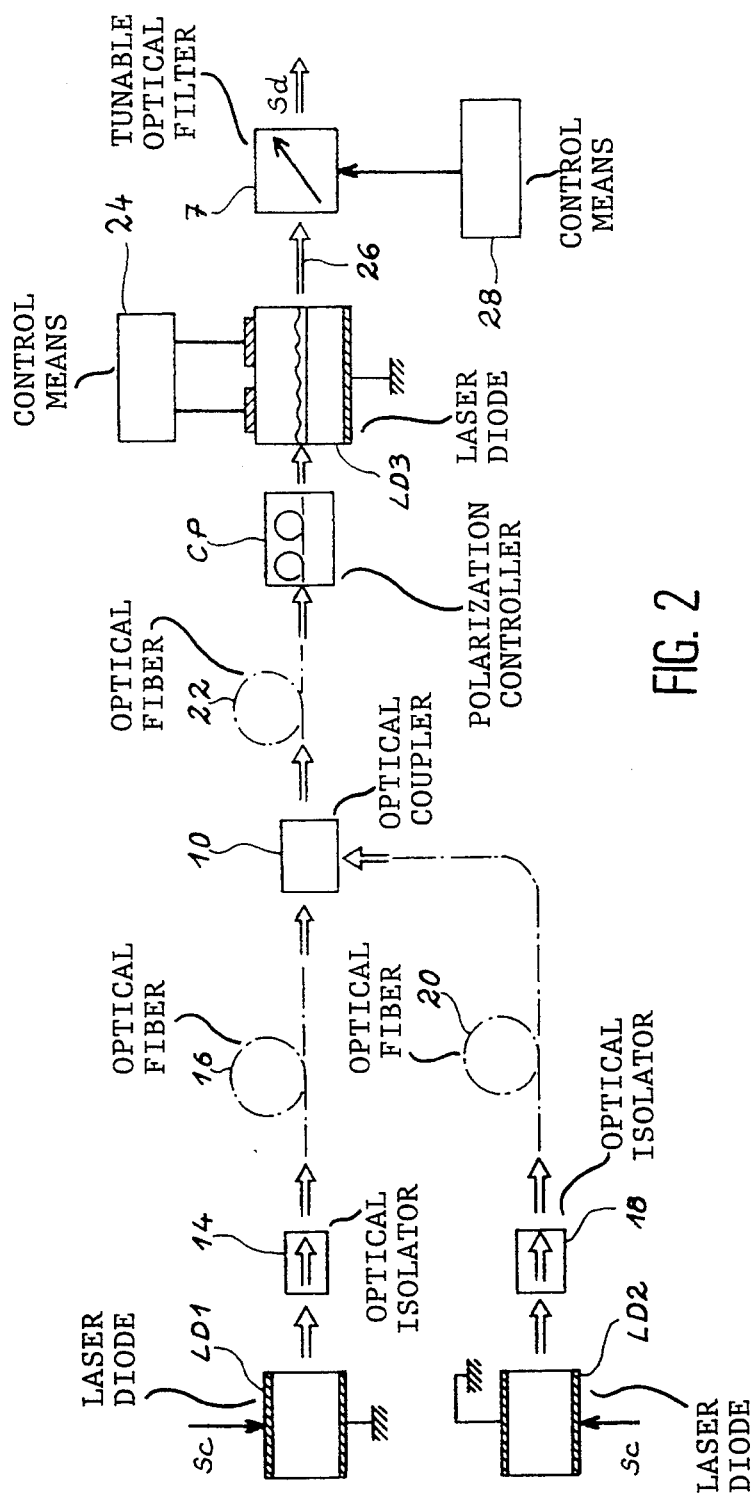
FIG. 2 shows an embodiment of the logic function generator.

The signal Sc obtained at the output of the interferometer 3 is injected into an optical logic function generator 9. This generator has an AM/FM converter 5 associated with an optical filter. The converter 5 makes it possible to convert the amplitude-modulated signals from the interferometer 3 into frequency-modulated signals. The converter 5 is preferably of the laser type. An embodiment of the logic function generator 9 is shown in FIG. 2. This logic function generator is able to supply at its output a logic function, in optical form, which is reconfigurable, i.e. said logic function can be chosen from among several logic functions realizable with said generator.

In order to carry this out, the generator uses an optical transposition in a distributed feedback laser diode thereof, as well as a frequency-tunable optical filter 7. Such an optical transposition is described in the document "Wavelength conversion for FM light using light injection induced frequency shift in DFB-LD" by K. INOUE and N. TAKATO published in Electronics Letters, 28.9.1989, Vol 25, No. 20, pp.1360–1362.

FIG. 2 diagrammatically shows an embodiment of this logic function generator comprising two monomode laser diodes LD1 and LD2, an optical coupler 10 having two inputs and one output (2 to 1 coupler), a distributed feedback laser diode LD3 and a frequency-tunable optical filter 7.

The laser diode LD1, at whose output is placed an optical isolator 14, is connected by an optical fibre 16 to an input of the optical coupler 10. In the same way, the laser diode LD2, at whose output is placed an optical isolator 18, is connected by an optical fibre 20 to the other input of the optical coupler 10.

The light supplied by the output of the optical coupler 10 is supplied to the laser diode LD3 by means of an optical fibre 22 and is injected into the active layer of said laser diode LD3.

The laser diode LD3, which has two polarizing electrodes, is provided with control means 24 for respectively supplying to said electrodes constant polarizing currents, chosen in such a way that the laser diode LD3 is monomodal and supplies at the output a laser beam 26.

In place of the laser diode LD3 with two electrodes, it would be possible to use a distributed feedback laser diode having a single polarizing electrode, but it would then have to undergo an antireflection treatment to make it monomodal (if it was not monomodal).

For as long as the laser diode LD3 receives no light signal from the optical coupler 10, the wavelength of the output light beam 26 is the idle or inoperative wavelength LO of the laser diode LD3. The optical frequency corresponding to said wavelength LO is designated F1.

The frequency-tunable optical filter 7 is placed at the output of the laser diode LD3 and is used for selecting one optical frequency among the optical frequencies of the light signals supplied by the laser diode LD3. This optical filter 7 can be controlled by appropriate means 28.

The laser diodes LD1 and LD2 are respectively controlled by the signal Sc from the interferometer 3. As the laser diodes LD1 and LD2 are controlled by the same signal, they respectively emit digital optical signals S1 and S2, which are synchronous and have the same rate. These optical signals are mixed by the optical coupler 10 and simultaneously injected into the active layer of the laser diode LD3.

It is pointed out that a polarization controller CP is placed at the input of the laser diode LD3 in order to give the signals S1 and S2 passing out of the optical fibre 22 a polarization direction in the polarization plane of the laser diode LD3 (plane of the active layer of said laser diode LD3).

Each of the optical signals S1 and S2 is a sequence of high levels (logic levels 1) and low levels (logic levels 0).

The light power injected into the laser diode LD3 varies in time.

Three cases occur:

a) two logic levels 0 respectively from the laser diodes LD1 and LD2 simultaneously reach the laser diode LD3, b) a logic level 0 from one of the laser diodes LD1 and LD2 and a logic level 1 from the other of said laser diodes LD1 and LD2 simultaneously reach the laser diode LD3 and c) two logic levels 1 respectively from the laser diodes LD1 and LD2 simultaneously reach the laser diode LD3.

In case a), the light power injected into the laser diode LD3 is zero. Therefore the optical frequency of the light beam 26 emitted by said laser diode LD3 is the idle frequency FI of the laser diode LD3.

In case b), the light power injected into said laser diode LD3 is not zero and the frequency of the light signal supplied by the laser diode LD3 slides to a value F2 above F1.

Finally, in case c), the light power injected into the laser diode LD3 is the maximum light power obtainable with the signals S1 and S2. The optical frequency of the light signal 26 supplied by the laser diode LD3, in case c), slides to a value F3 higher than F2.

Thus, at the output of the laser diode LD3, a digital optical signal is obtained, whose optical frequency passes successively from one of the values F1, F2 and F3 to another of these values during a time t.

Thus, the digital optical signal Sd obtained at the output of the frequency-tunable optical filter 7 is a function of what the optical filter has selected as a frequency, namely the frequency F1, the frequency F2 or the frequency F3.

The optical filter 7 also makes it possible to select one of the three logic functions, namely AND, NOR and XOR.

More specifically, when the frequency F1 is selected, the digital optical signal Sd supplied by the optical filter 7 corresponds to the NOR logical function. When the frequency F2 is selected, said digital optical signal Sd corresponds to the XOR logic function. Finally, when the frequency F3 is selected, said digital optical signal Sd corresponds to the AND logic function.

Thus, the optical logic function generator is remarkable due to the fact that said logic function is reconfigurable, i.e. it can be chosen from among several logic functions depending on the optical frequency selected by the frequency tunable optical filter, which can be a tunable Perot Fabry interferometer.

In another special embodiment, the frequency-tunable optical filter 7 is constituted by an auxiliary distributed feedback laser diode, which is polarized below its threshold current by appropriate means.

This auxiliary laser diode has two polarizing electrodes and by setting the value of the polarizing currents respectively supplied by the appropriate means it is possible to choose the value of the frequency selected by said auxiliary laser diode forming the optical filter.

With reference to such a laser diode forming an optical filter reference can e.g. be made to French patent application 9,006,926 of 5.6.1990 entitled "Bidirectional transmission system having identical laser components".

The signal Sd supplied on the output 5b of the converter 5 is therefore a signal frequency-modulated on three frequencies F1,F2 and F3, whereof the time duration of the states has not undergone modifications This signal Sd is then introduced into the optical filter 7 by the input 7a of said filter, which is connected to the output 5b of the converter 5. This optical filter can e.g. be set to the frequency F2, so that the logic function generator 9 establishes the XOR function.

According to an application of the device according to the invention, the aim is to recover the clock from a signal encoded by the NRZ code. In order to recover the clock or timing of such a signal, the optical logic function to be established is the XOR function, which is obtained by setting the optical filter 7 to the frequency F2 of signal Sd introduced into said optical filter 7.

According to another example, the logic function generator 9 can establish the AND logic function in order to recover the clock of a signal encoded by a biphase code.

In addition, the signal Se supplied by the output 7b of the filter 7 responds to the conditions necessary to permit the implementation of the coded signal timing recovery circuit. As stated hereinbefore, these conditions are that the signal Se, which is a pulse train, has pulses of duration equal to the half clock period T/2 and in the present case equal to N×T, in which the coefficient N is a time-variable integer and whereof the maximum value is essentially dependent on the code of the coded signal introduced into the circuit 1.

FIG. 3 diagrammatically shows the coded signal timing recovery circuit 19 and which will be referred to as circuit 19.

This timing recovery circuit 19 is connected to the output 7b of the coded signal shaping circuit 1. The circuit 19 incorporates a two-to-two coupler. Preferably, said coupler is in optical fiber form, so as to permit the continuity of the propagation of the optical signal Se obtained at the output of the shaping circuit 1.

Figure 4:
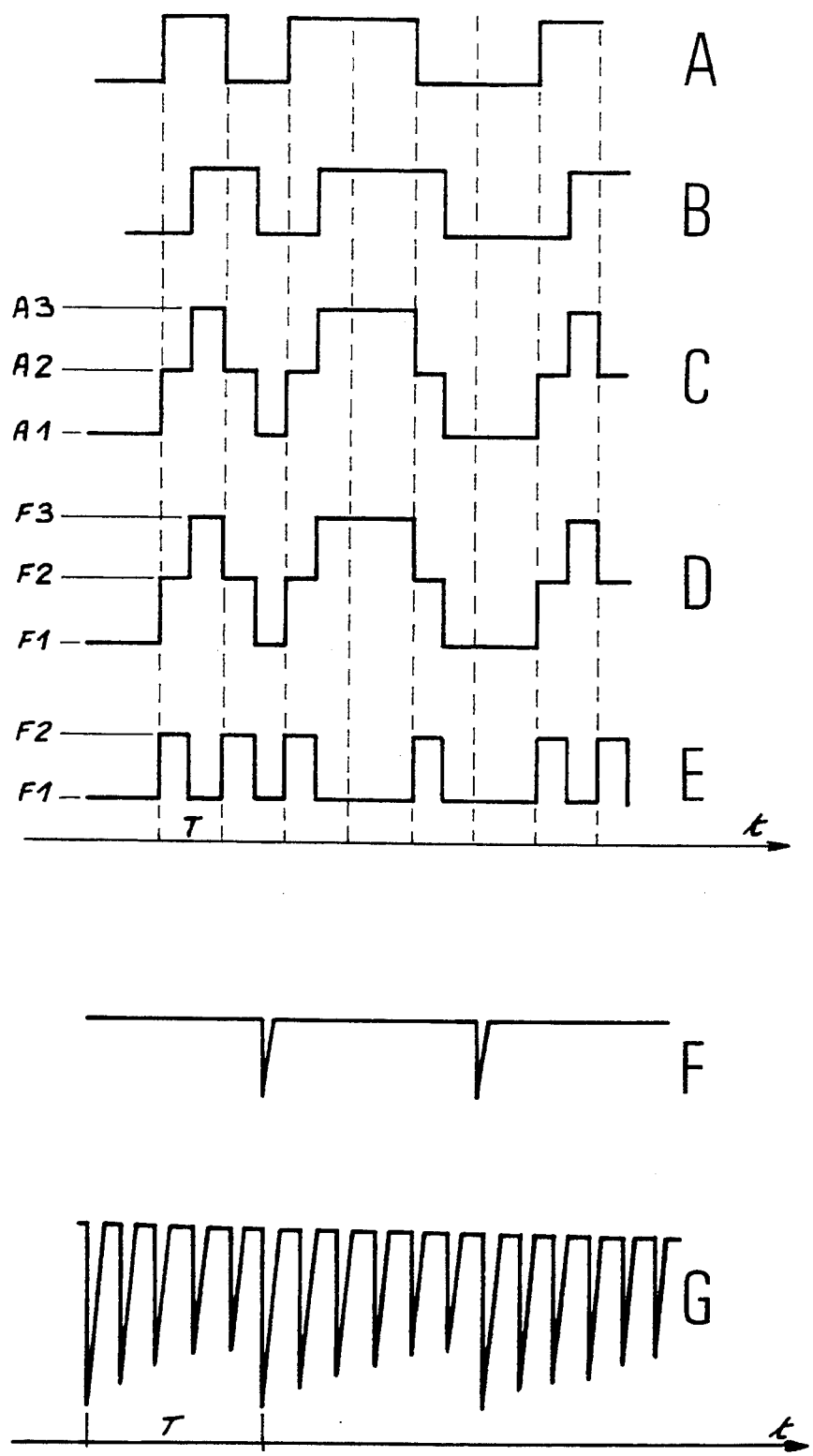
FIG. 4A–4G illustrate(s) the different signals obtained during the processing by the device according to the invention: A and B representing the signals used by the interferometer; C the signal amplitude-modulated on three levels; D the frequency-modulated signal; E the signal amplitude-modulated on two levels; F the pulse obtained at the output of the shaping circuit; and G the timing signal.

This two-to-two coupler 11 in FIG. 3 has first and second inputs respectively 11a and 11b, and first and second outputs, respectively 11c and 11d. The input 11a receives the signal from the output of the shaping circuit 1. This signal is designated Sf in FIG. 3 and corresponds to the signal Se in FIG. 1. However, it has a different reference so as to ensure a coherence between the signals Sf and Sg of FIG. 3, which are shown in FIG. 4 in a time marker different from the signal Se.

The output 11d of the timing recovery circuit 11 supplies the signal Sg corresponding to the sought clock signal. The output 11c of the coupler 11 is connected to the input 11b of said coupler, so as to form a feedback loop. An amplifier 13 and an optical filter 15 are connected in series with one another in the feedback loop, i.e. they are connected downstream of the output 11c and upstream of the input 11b of the coupler. The lengths of the amplifier 13 and the optical filter 15 have to be adjustable, so that the optical signal propagation time in said loop is equal to the clock period T which it is wished to recover.

Thus, at the output 11d of the coupler 11 are recovered at regular intervals, fractions of the signal propagating in the feedback loop. These signal fractions form the sought clock or timing signal.

When the coded signal Si has long sequences of 0 or 1, the spacing between two pulses of the signal Se entering the coupler 11 can lead to a relatively large variation in the level of the pulses of the signal Sg obtained at the output of the coupler 11. In order to mitigate these variations, an optical equalizer 17 is connected to the output 11d of the coupler 11. According to an embodiment, this optical equalizer 17 is an optical amplifier similar to the amplifier 13 used in the feedback loop. The non-linearity of the gain curve of this amplifier 17, when it functions in saturation, makes it possible to correct the amplitude variation of the pulses of the signal Sg. The signal obtained at the output of this optical equalizer 17 is designated Sg'.

Preference is given to the use in the device according to the invention of optical amplifiers 13 and 17 of the semiconductor optical amplifier type, whose propagation time is below 5 picoseconds.

FIG. 4 shows the different signals obtained during the processing by the device according to the invention.

The signal represented at A is the signal Sa, which is one of the signals of the two paths of the interferometer 3. The signal Sb is the signal obtained for the second path of the interferometer 3. The signal Sb shown at B is displaced by a half-cycle with respect to the signal shown at A. This half-cycle T/2 is equivalent to the delay R caused by the interferometer 3 on the signal flowing in the path Tb with respect to the signal flowing in the path Ta. More specifically, these signals Sa and Sb, respectively shown at A and B, are substantially identical to the coded signal Si, but are time-displaced by a half-cycle for the signal Sb.

The signal shown at C, i.e. the signal Sc obtained at the output of the interferometer 3, is a signal resulting from the sum of the signals Sa and Sb. This signal Sc is a signal modulated in amplitude according to three levels A1, A2 and A3, as shown in FIG. 4.

The signal Sd shown at D in FIG. 4 represents the signal obtained at the output of the converter 5, i.e. the frequency-modulated signal. This signal Sd has three frequency levels F1, F2 and F3. The states of the signal Sd are identical from the time duration standpoint to those of the amplitude-modulated signal Sc.

The signal Se shown at E in FIG. 4 represents the signal obtained at the output of the coded signal shaping circuit 1. This signal Se is the signal obtained after adjustment to the frequency F2 by the optical filter 7. Therefore this signal Se is frequency-modulated according to two levels F1 and F2.

The signals Sf and Sg shown at F and G correspond to the signals occurring at the input and output of the timing recovery circuit 11. The signal Sf shown at F represents the same signal as the signal Se, but in a different time marker from that of Se. Thus, the signals represented at F and G illustrate the signals which would be obtained on an oscillator placed at the input and output of the timing recovery circuit 19. Thus, the signal Sf illustrates the pulses obtained at the output of the coded signal shaping circuit 1.

The signal Sg shown at G represents the clock signal obtained at the output of the coupler 11, i.e. the sought clock signal.

With respect to the signal Sg shown at G in FIG. 4, the amplitude of the signal decreases between two successive passages. This phenomenon is explained by the fact that it is necessary to maintain the gain of the feedback loop at below 1, so as to avoid any undesired oscillation of the optical amplifier 13 of the feedback loop. The optical filter 15, which partly eliminates the spontaneous emission, makes it possible to raise the undesired oscillation threshold and consequently improve the loop gain and limit the amplitude variation between two successive pulses. The amplitude of the signals is also modified by the superimposing of pulses simultaneously flowing in the feedback loop, which occurs when the occurrence time of the injected pulses is below the damping time. Thus, when the time separating two pulses of the signal Sf entering the coupler 11 and that of the path of the feedback loop are strictly identical, there is a relatively high beat noise. An overlap between the pulses is then produced in the loop by the rotation of the input pulses N and N+1. This overlap is due to the fact that the spacing between these two pulses N and N+1 is below the feedback loop damping time. The photodetector simultaneously receiving the two pulses N and N+1, the detection being of the automatic homodyne type, so that the beat noise is produced. This beat noise has no consequence in the case of timing recovery. However, when it is wished to observe the signal, an optical-electrical conversion is necessary. To ensure a good conversion, it is important to eliminate this beat noise. In addition, to eliminate this beat noise, a slight time discord is introduced between the time separating the two pulses N and N+1 and the path time in the feedback loop.

What is claimed is:

1. An optical device for recovering the timing of a signal (Si) coded by a digital code and transmitted to said device by means of optical fiber links, and comprising, a circuit for shaping and transcribing the coded signal into the form of a pulse train (Se) of duration equal to T/2 and occurrence equal to $N \times T$, in which T is the cycle of the timing of the coded signal and N is an integer varying as a function of the digital code encoding the coded signal, said circuit having an input for receiving the coded signal, an interferometer of delay $R = N \times T/2$ for transforming the coded signal into an amplitude-modulated signal and an output for supplying the pulse train and a timing recovery circuit having first and second inputs and first and second outputs, the first input being connected to the output of the shaping circuit and the first output being connected to the second input to form a feedback loop and is for determining, for each cycle of the timing, a fraction of the signal propagating in the feedback loop in order to supply to the second output, said signal fraction corresponding to the timing signal.

2. A device according to claim 1, wherein the interferometer is a MACH-ZEHNDER interferometer in optical fiber form.

3. A device according to claim 1, wherein the coded signal shaping circuit comprises an AM/FM converter connected in series with an interferometer, in order to convert the amplitude-modulated signal into a frequency-modulated signal.

4. A device according to claim 3, wherein the AM/FM converter comprises a laser converter.

5. A device according to claim 3, wherein the coded signal shaping circuit incorporates an optical filter connected in series with the AM/FM converter and which is for being set to one of the frequencies of the frequency-modulated signal in order to establish logic functions, the choice of the logic function to be established depending on the digital code of the coded signal.

6. A device according to claim 1, wherein the timing recovery circuit has a two-to-two coupler for introducing the pulses from the coded signal shaping circuit and obtaining the feedback loop.

7. A device according to claim 6, wherein the two-to-two coupler is in optical fiber form.

8. A device according to claim 6, wherein the timing recovery circuit comprises an amplifier and an optical filter connected in series in the feedback loop.

9. A device according to claim 1, wherein an optical equalizer is connected to the second output of the recovery circuit.

* * * * *